J. J. LONSWAY.
CORN HARVESTER AND SHOCKER.
APPLICATION FILED FEB. 9, 1910.

1,014,497.

Patented Jan. 9, 1912.

6 SHEETS—SHEET 1.

WITNESSES:

INVENTOR
John J. Lonsway
BY
ATTORNEYS

J. J. LONSWAY.
CORN HARVESTER AND SHOCKER.
APPLICATION FILED FEB. 9, 1910.

1,014,497.

Patented Jan. 9, 1912.
6 SHEETS—SHEET 2.

WITNESSES:

INVENTOR
John J. Lonsway
BY
ATTORNEYS

J. J. LONSWAY.
CORN HARVESTER AND SHOCKER.
APPLICATION FILED FEB. 9, 1910.

1,014,497.

Patented Jan. 9, 1912.
6 SHEETS—SHEET 3.

WITNESSES:

INVENTOR
John J. Lonsway
BY
ATTORNEYS

J. J. LONSWAY.
CORN HARVESTER AND SHOCKER.
APPLICATION FILED FEB. 9, 1910.

1,014,497.

Patented Jan. 9, 1912.
6 SHEETS—SHEET 4.

WITNESSES:

INVENTOR
John J. Lonsway
BY
ATTORNEYS

J. J. LONSWAY.
CORN HARVESTER AND SHOCKER.
APPLICATION FILED FEB. 9, 1910.

1,014,497.

Patented Jan. 9, 1912.

6 SHEETS—SHEET 5.

WITNESSES:

INVENTOR
John J. Lonsway
BY
ATTORNEYS

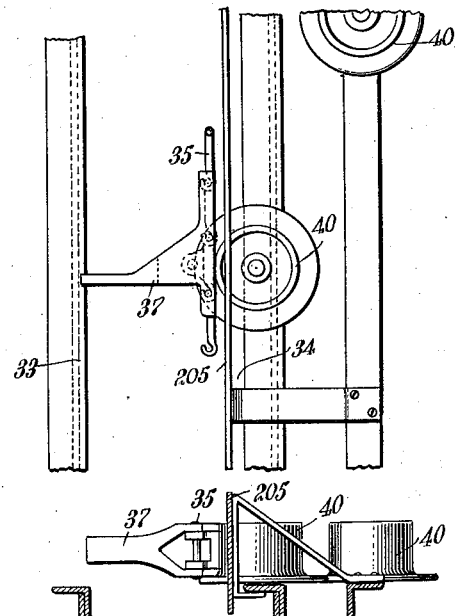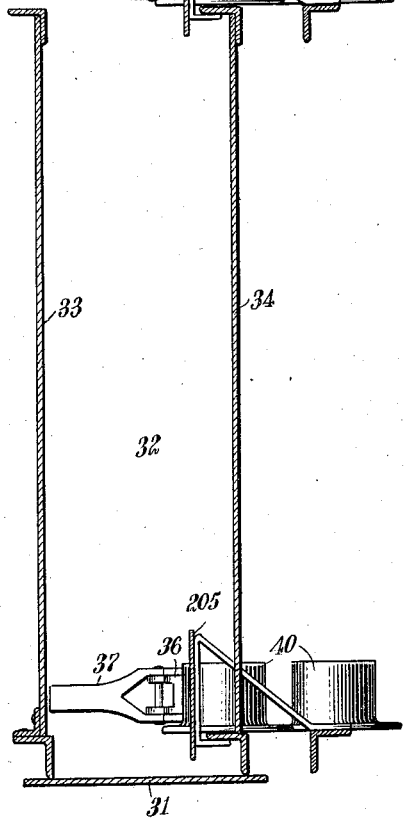

UNITED STATES PATENT OFFICE.

JOHN J. LONSWAY, OF FOSTORIA, OHIO.

CORN HARVESTER AND SHOCKER.

1,014,497.  Specification of Letters Patent.  Patented Jan. 9, 1912.

Application filed February 9, 1910. Serial No. 542,857.

*To all whom it may concern:*

Be it known that I, JOHN J. LONSWAY, a citizen of the United States, and a resident of Fostoria, in the county of Seneca and State of Ohio, have invented a new and Improved Corn Harvester and Shocker, of which the following is a full, clear, and exact description.

This invention relates to a new and improved harvester of a type adapted to cut standing corn, assemble it in shocks, and deposit the shocks on the ground with the parts thereof in spaced relation, for the purpose of ventilation.

An object of this invention is to provide a device which will be simple in construction, inexpensive to manufacture, strong, durable, and efficient, positive and automatic in its operation.

A further object of this invention is to provide a harvester with means for assembling the stalks in shocks, with provision for intermittently rendering the feeding mechanism to said assembling mechanism inactive while the assembled shock is being deposited on the ground.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1:
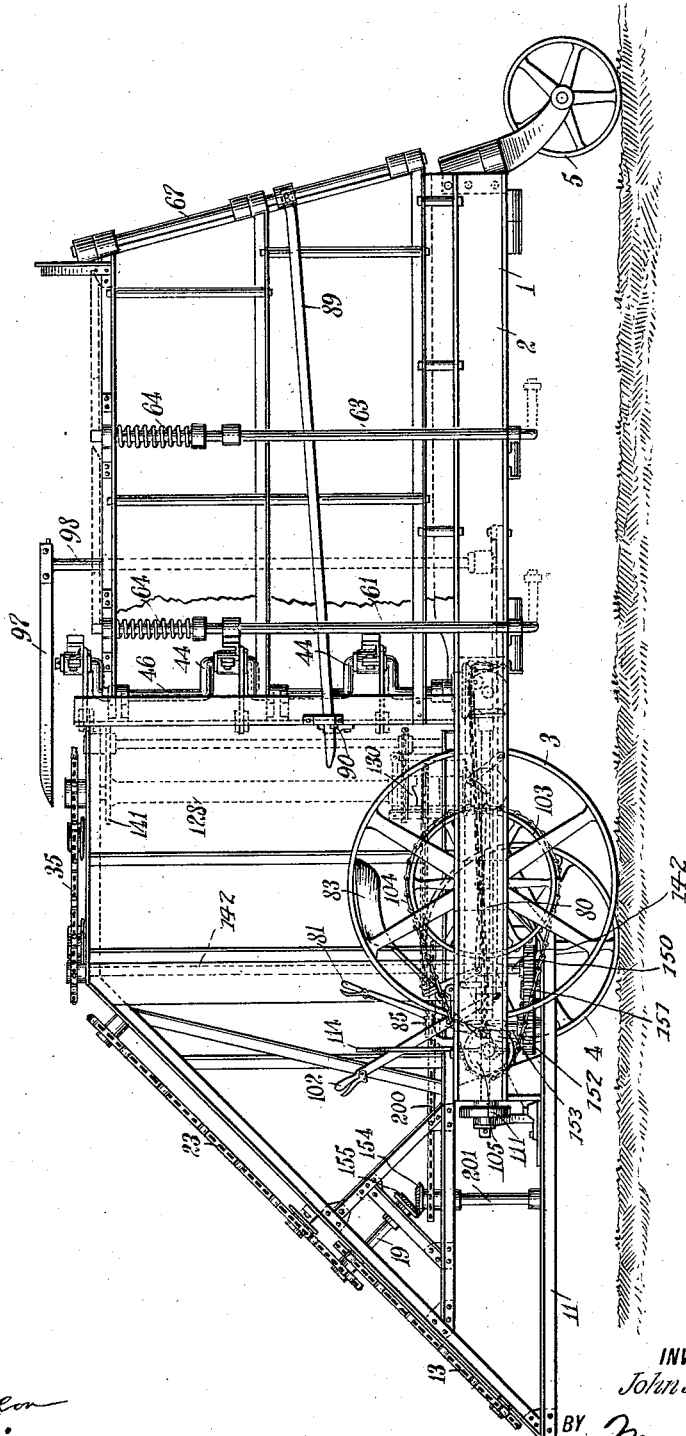
Figure 2:
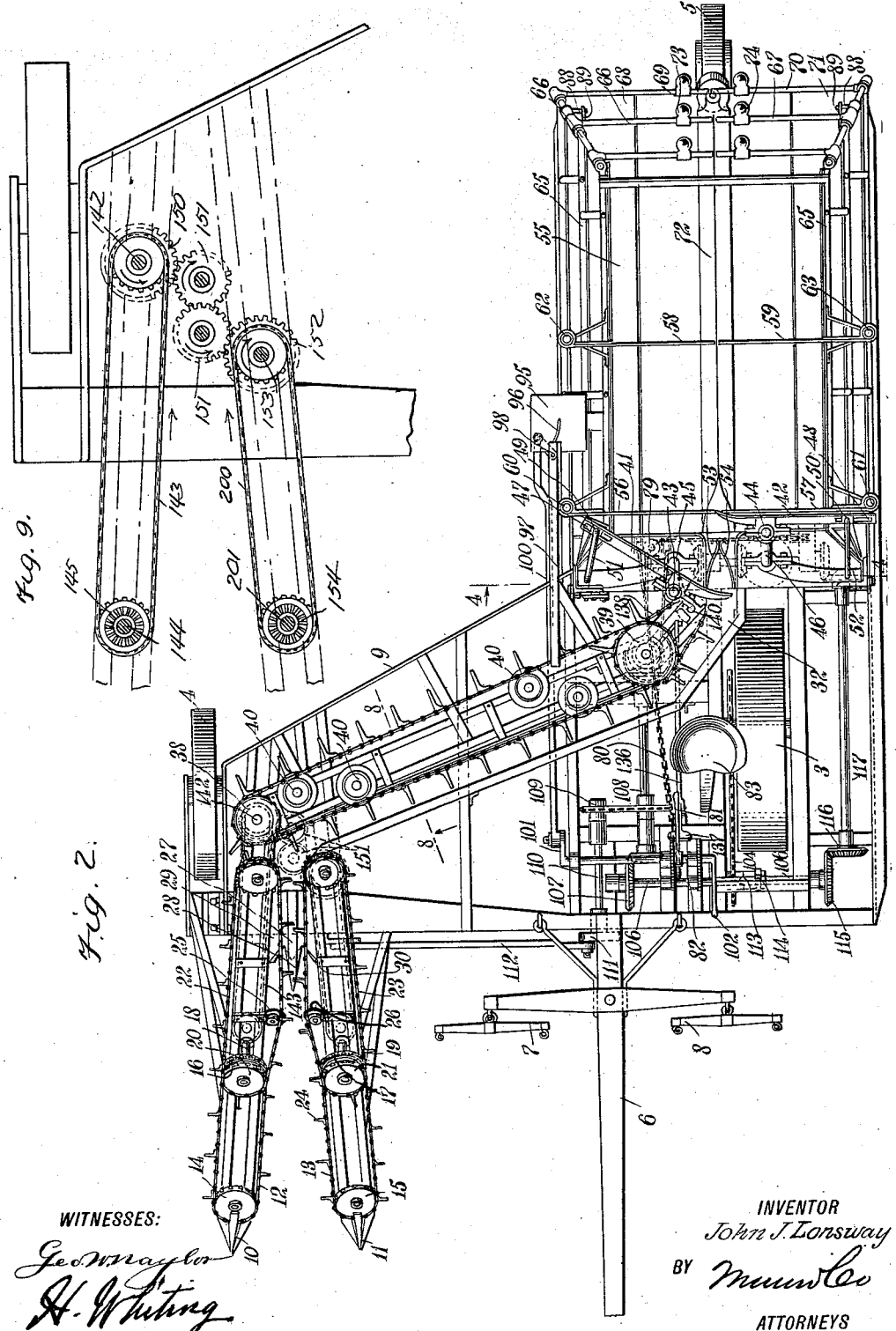
Figure 3:
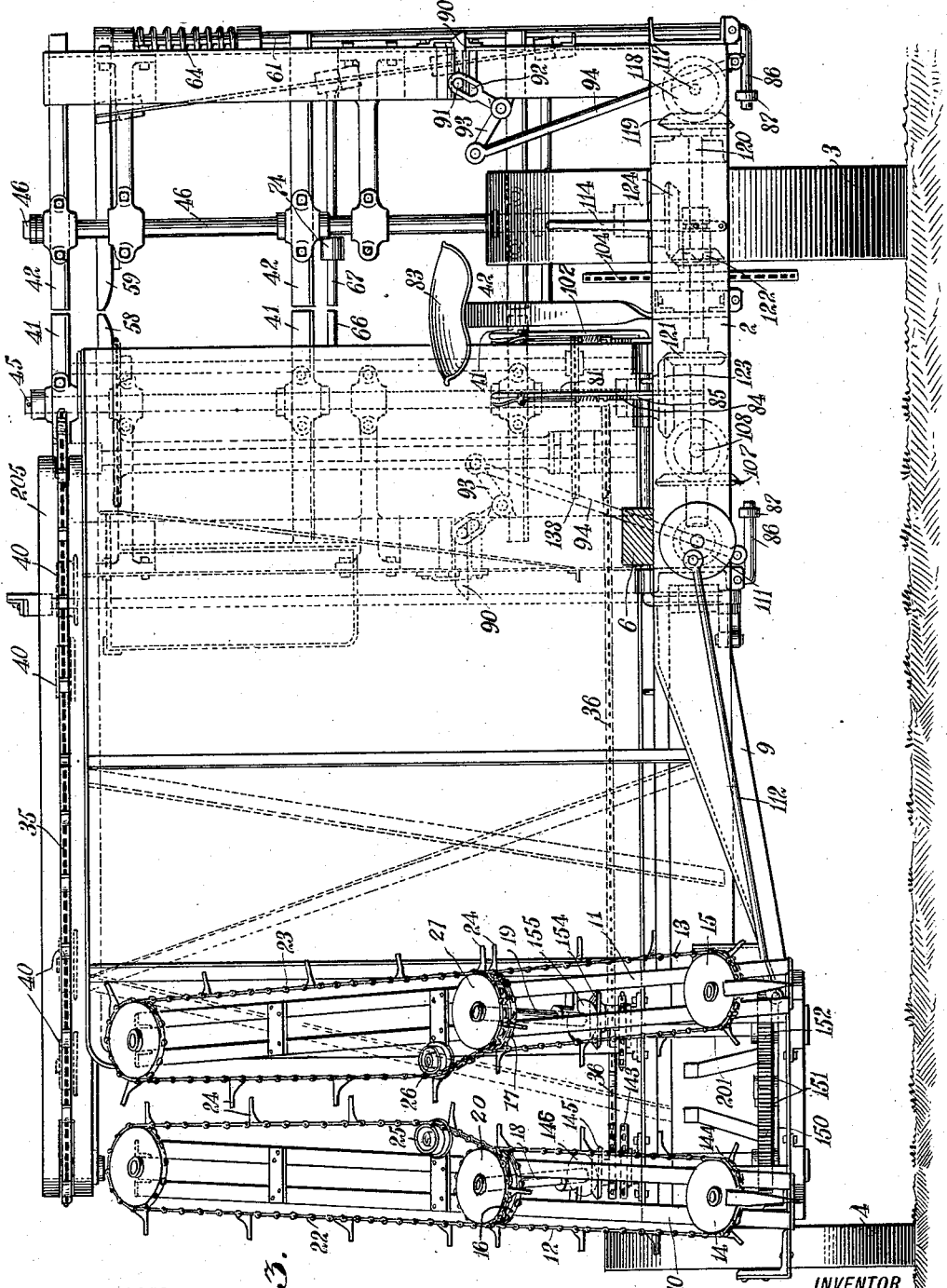
Figure 4:
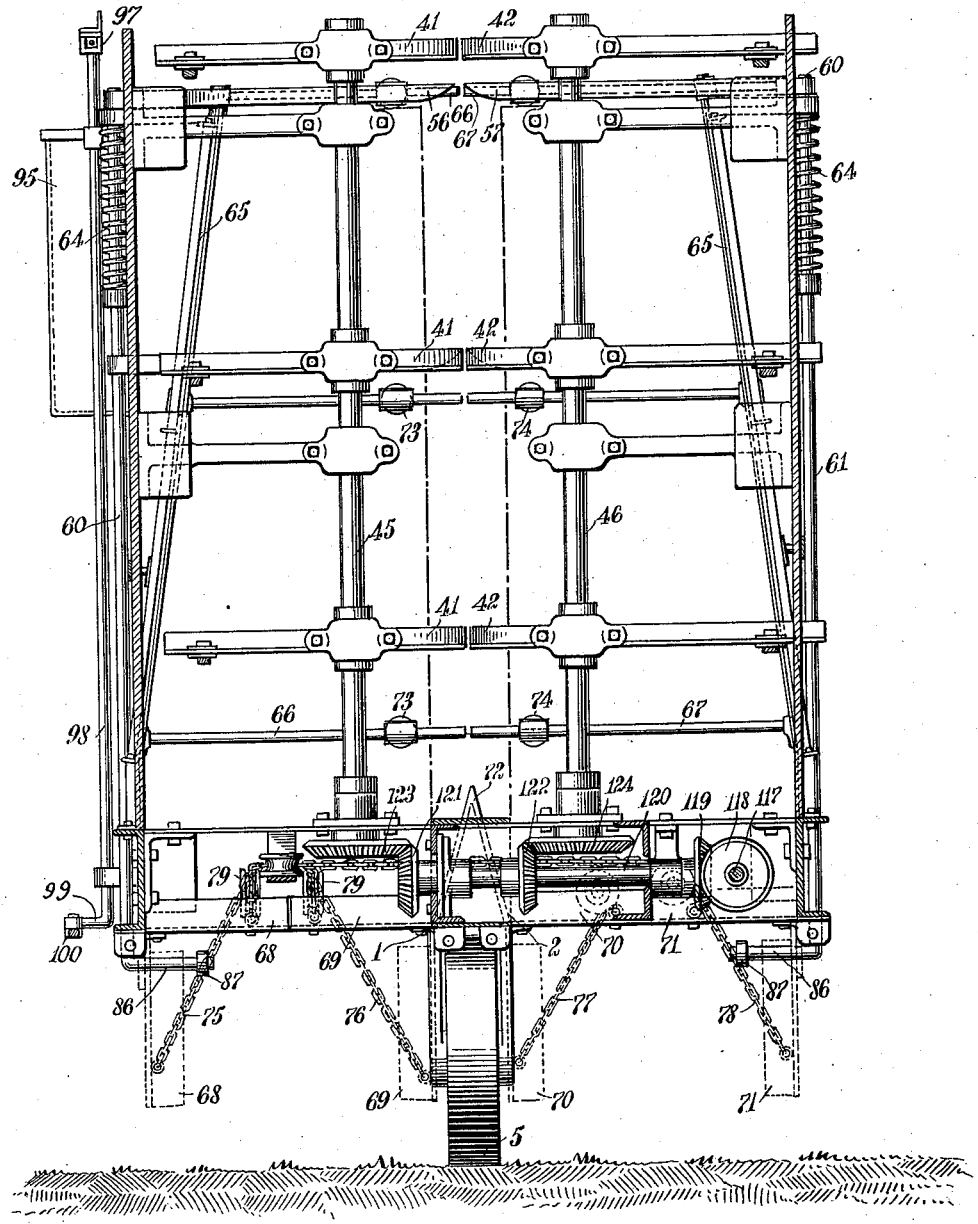
Figure 5:
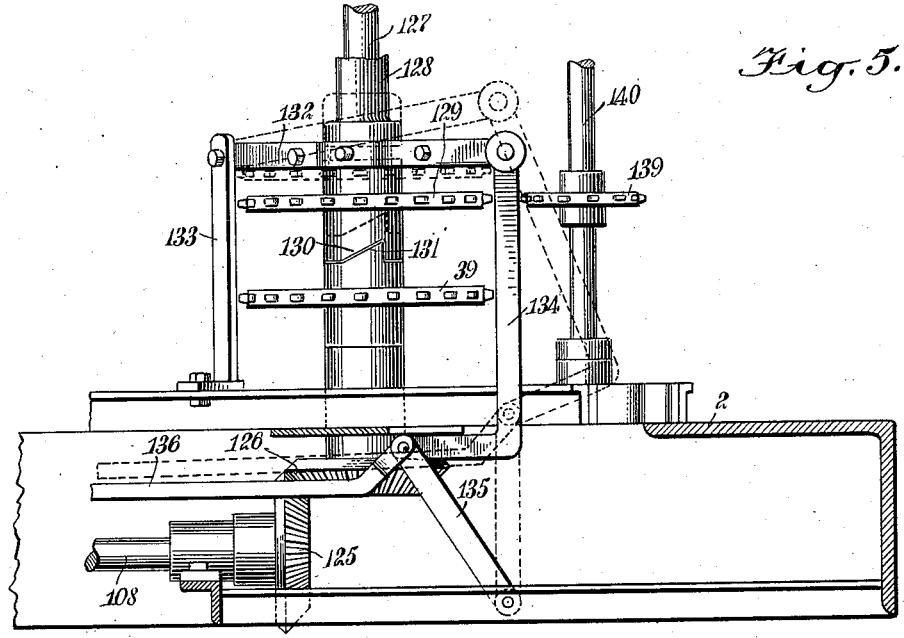
Figure 6:
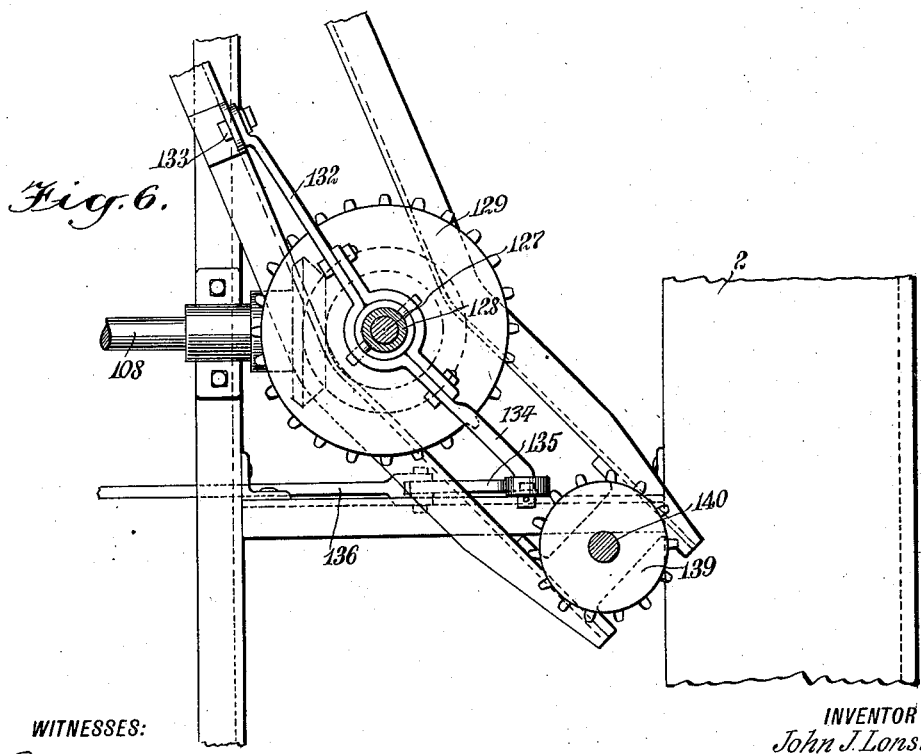

Figure 1 is a side view in elevation, partly broken away to show the underlying mechanism; Fig. 2 is a top plan view; Fig. 3 is a front view in elevation, with the pole and whiffletrees removed for the sake of simplicity; Fig. 4 is a vertical section on the line 4—4 of Fig. 2; Fig. 5 is an enlarged sectional fragmentary view in elevation, showing details of the mechanism for rendering the feeding conveyer operative and inoperative; Fig. 6 is a fragmentary enlarged horizontal section of the mechanism illustrated in Fig. 5; Fig. 7 is an enlarged detail view in plan, of the feeding conveyer; Fig. 8 is a vertical transverse section on the line 8—8 in Fig. 2; and Fig. 9 is a fragmentary horizontal section showing details of the gathering mechanism.

Referring more particularly to the separate parts of the device, 1 indicates a carriage, which consists of a frame 2 composed of any suitable light structure, such as a net-work of angle-iron and channel beams, which is supported by a main traction wheel 3, an outrigging wheel 4, and a pivot wheel 5, which is swivelly supported on the frame 2, midway the back portion thereof. The carriage is adapted to be hauled over the field by any suitable means, such as draft animals attached to a pole 6 and whiffletrees 7 and 8. The device may be, if desired, however, driven over the ground by suitable mechanical or electrical motive power.

The frame 2 is provided with an extension 9, at one side thereof, which is supported by the outrigging wheel 4, and is adapted to support the means for cutting and lifting the corn from the field. Extending forwardly on the extension frame 9, there are provided a pair of bracket frames 10 and 11, which are spaced apart from each other and diverge outwardly from each other so as to form a convenient scooping-in guide for the stalks to be cut. In order that the stalks, as they come within the bracket frames 10 and 11, may be swung up into a vertical position, and the drooping ends supported in proper erect relation, there are provided on the frames 10 and 11, gathering conveyers 12 and 13, which are suitably supported in an inclined position on the frames 10 and 11 at their lower ends, by means of sprockets 14 and 15, and at their upper ends by means of sprockets 16 and 17 on shafts 18 and 19. These shafts are driven in a manner to be described hereinafter. Also secured on the shafts 18 and 19, there are provided additional sprockets 20 and 21, which drive endless gathering conveyers 22 and 23 which extend upwardly from the conveyers 12 and 13, and form a continuation thereof. All of the conveyers, 12, 13, 22 and 23, are provided with suitable fingers 24, which are secured thereto in any well known manner and adapted to pick up the stalks with little or no trouble and feed them in between the frames 10 and 11.

It is to be noted that the endless gathering conveyers 22 and 23 are converged toward each other by means of guide rollers 25 and 26, so that they gradually gather the stalks in a narrow channel and feed them in juxtaposition to cutting mechanism 27. This cutting mechanism 27 may be of any suitable character, but preferably consists of a dividing member 28, which is in the form of an outstanding spike or tooth which separates the stalks into two bunches, so that they may be readily cut by a cutter-bar 29, which is slidingly supported in any suitable manner on the extension frame 9.

The cutter bar 29 consists preferably of double-edged blades 30, so that it will cut on both sides, and thereby increase the efficiency of the machine. The stalks thus cut from the growing plants are deposited by the gathering conveyers 22 and 23 onto an apron 31, forming the bottom of an alley 32, more clearly illustrated in Figs. 7 and 8. The alley 32 is formed between the apron 31 and vertical walls 33 and 34, which are composed of any suitable material and are secured to the frame 2 in any suitable manner.

The stalks delivered to the alley 32 are fed therethrough by means of a pair of parallel endless conveyers 35 and 36, which are provided with specially pivoted fingers 37 for the purpose of more readily engaging the stalks. These conveyers 35 and 36 may be termed the feeding conveyers, and are supported on and driven by sprockets 38 and 39, which are so positioned that the feeding side of the conveyers extends through the alley 32, while the return extends without the alley. These feeding conveyers are held in proper position and prevented from wabbling by means of a plurality of flanged guide rollers 40. These conveyers are also held in parallel relation with the walls of the alley by means of strips 205, which extend back of the chains on their conveying sides.

The feeding conveyers 35 and 36 deliver the stalks in an erect position to an auxiliary conveyer, to be described hereinafter, which delivers them into the sphere of operation of a plurality of packing arms 41 and 42, arranged in opposed relation in pairs. The packing arms 41 and 42 are pivotally connected intermediate their ends to cranks 43 and 44 on crank shafts 45 and 46, in such a manner that the facing points of the packing arms will be in opposite phases of their travel at any moment. The outer ends of the packing arms 41 and 42 are provided with slots 47 and 48, which are engaged by followers 49 and 50 on limiting cranks 51 and 52, which are pivotally supported on the frame in any well known manner. It will thus be seen that as the cranks 45 and 46 rotate, the points of the packing arms 41 and 42 will be alternately swung across the end of the alley 32, feeding successive portions of the accumulating stalks towards the rear of the machine.

Located in the path of the stalks, in juxtaposition to the travel of the packing arms 41 and 42, there is provided a non-return gate, composed of a plurality of trap-springs 53 and 54, which converge at their rear in a yielding manner so that the packing arms 41 and 42 may force the stalks between them, but when once by these springs, the stalks will be prevented from returning into the alley 32. The packing arms 41 and 42 squeeze the stalks in an erect position into a crib 55 located at the rear of the frame.

In order to prevent the stalks from tumbling over into the crib when forced thereinto by the packing arms 41 and 42, there are provided a plurality of pairs of oppositely-extending spring arms 56, 57, 58 and 59, which yieldingly resist the incoming stalks and hold them in a vertical position on the crib 55. These spring arms 56 to 59 are secured to vertical shafts 60, 61, 62 and 63, which are rotatably supported on the crib 55 and the frame 2 in any well known manner. These shafts 60 to 63, however, are normally held in such a manner that the arms 56 to 59 will extend transversely of the frame 2 and across the crib 55 into the path of the incoming stalks. In order that these arms 56 to 59 may yield backwardly, the shafts 60 to 63 are provided with spiral springs 64, which are secured to the shafts 60 to 63 at one end, and to the crib 55 at the other end, so that they will permit the yielding backward swing of the arms 56 to 59, and will automatically return these arms to their transversely-extending position when the resistance is removed.

The crib 55 is composed of sides 65, which incline vertically toward each other, end gates 66 and 67, bottom doors 68, 69, 70 and 71, arranged in pairs and swinging away from each other, and a divider 72 superposed above the hinge connection of the doors 69 and 70, and extending longitudinally of the frame 2.

It is to be noted that the gates 66 and 67 are hinged to the sides 65, so that their hinge joint will conform to the inclination of the sides, and thus adapt the gates to swing toward each other and be normally held closed by reason of the fact that they are pivoted on inclined rods. In order to increase this action and positively insure the automatic closing of the gates 66 and 67, they are provided with a plurality of weights 73 and 74, which are secured thereto in any well known manner.

The divider 72, the form of which is more clearly illustrated in Fig. 4, consists of an inverted V-shaped member extending longitudinally of the frame in such a position that it will divide the shock as it falls from the crib 55 when the doors 68 to 71 are opened, thereby forming a ventilating passage in the shock, and spreading the butts thereof so as to give a firm base to the shock, and also permitting the swivel steering wheel 5 to pass through beneath the shock, leaving it deposited on the ground.

In order to raise the doors 68 to 71 from their dropped position, as indicated in the dotted lines in Fig. 4, to their raised position, as indicated in the full lines in Fig. 4, there are provided a plurality of branch chains 75, 76, 77 and 78, which are secured at one end to the doors 68 to 71, and extend over suitable guide pulleys 79 to points where they are joined to a common chain 80, which extends to the under side of a lever 81, pivotally secured to a shaft 82 in juxtaposition to an operator's seat 83. It will thus be seen that by pulling the lever 81 backward, the slack on the chain 80 will be drawn up, and the doors 68 to 71 will be closed, where they may be locked in their closed position by means of a latch 84, engaging a stationary rack sector 85 on the frame 2.

It is to be noted that the shafts 60 to 63 are provided with arms 86, on the ends of which are anti-friction rollers 87. These arms 86 are so connected to the shafts 60 to 63 that they will extend under the framework and beneath the doors 68 to 71 when the latter are closed and when the arms 56 to 59 extend transversely of the frame 2 and the crib 55. It is to be noted, however, that this very arrangement will prevent the shafts 60 to 63 from rotating and the arms 56 to 59 from extending across the crib 55 when the bottom doors 68 to 71 are open, so that the spring arms 56 to 59 will not interfere with the relative motion of the shock and the machine when the former is being deposited on the ground.

The mere weight of the rear gates 66 and 67 would not be sufficient to withstand the combined weights of the stalks forming the shock in the crib 55, and it is therefore necessary to lock these gates in their closed position. For this purpose, each of these gates is provided with a lug 88, which form suitable fastening means for locking bars 89 extending forwardly along each side of the crib 55 to the front end thereof, where they are each provided with a locking groove, whic is adapted to be engaged by a latch 90. The latches 90 are slidingly supported on the framework of the crib, and are each provided with a pin 91, which engages in a slot 92 in a bell crank lever 93 pivoted on the crib framework. The other arms of the bell crank levers 93 are connected to the bottom doors 68 to 71 by means of links 94. It will thus be seen that when the bottom doors are dropped, the locking bars 89 will be simultaneously released, thereby permitting the gates 66 and 67 to swing outwardly when the shock reaches the ground and tends to remain stationary during the forward travel of the harvester.

It is advisable to bind the assembled shock before depositing it on the ground, so that it will not be easily disconnected. For this purpose, there is provided on the side of the frame 2 a twine box 95, which is adapted to retain in any well known manner a bobbin or ball of suitable twine, which is indicated at 96, and which extends through a hollow arm 97 and comes out at the opposite end. The hollow arm 97 is secured to a shaft 98, which is provided with a short lever arm 99, whereby it may be swung over the top of the crib, carrying the twine with it, so that it will be convenient for the operator, and at the same time forming a retaining packing arm which holds the formed shock in position while the operator binds the stalks thereof together. The short arm 99 which is connected to the hollow twine arm 97, is connected by means of a link 100 to a crank 101 on the shaft 82. The opposite end of the shaft 82 is provided with a lever 102, whereby it may be operated to swing the hollow twine arm 97 back and forth toward and from the operator, stationed on the opposite side of the crib.

Having described the particular operating features, we now come to the driving connections whereby the operating parts are driven from the common drive wheel 3.

Secured to the axle of the traction or drive wheel 3, there is provided a sprocket wheel 103, which drives a chain 104, the latter in turn driving a sprocket wheel 105 on a shaft 106. The sprocket wheel 105 is loosely mounted on the shaft 106, and is provided with a clutch face which engages a corresponding clutch face on a clutch 113. This clutch is of the common spring type, and is adapted to be manipulated by means of a suitable lever 114, so as to operatively connect and disconnect the driving mechanism with the shaft 106.

Considering first the driving connection of the cutting mechanism with the shaft 106, this shaft is provided with a bevel gear 107, which meshes with a bevel gear on a longitudinally-extending shaft 108, which is connected by a sprocket gear and chain connection, indicated at 109, to a shaft 110 extending parallel thereto. The shaft 110 is provided at its front end with a crank 111, which is connected by means of a link 112 to the cutter bar 29, thereby operating the cutting mechanism to separate the stalks from the roots in the ground as they are delivered thereto by the gathering conveyers. The opposite end of the shaft 106 is provided with a bevel gear 115, which meshes with a bevel gear 116 on a shaft 117, the latter being provided at its opposite end with a bevel gear 118, which in turn meshes with a bevel gear 119 on a counter-shaft 120. The counter-shaft 120 is provided with a pair of oppositely-facing bevel gears 121 and 122, which mesh respectively with bevel gears 123 and 124 on the crank shafts 45 and 46 which operate the packing arms 41 and 42.

The shaft 108, which is one of the members utilized in driving the cutting mechanism, extends rearwardly beyond its chain-and-sprocket connection with the shaft 110, and is provided with a bevel gear 125, as is more clearly illustrated in Fig. 5, which meshes with a bevel gear 126 on a vertical shaft 127. The shaft 127 has secured thereon, adjacent its top and bottom, the sprocket wheels 39 which drive the feeder conveyer chains 35 and 36. Loosely mounted on the shaft 127 intermediate the feeder chain sprockets 39, there is provided a quill or sleeve shaft 128, which has secured adjacent its upper and lower ends, sprocket wheels 129, the purpose of which will be described hereinafter. The lower end of the sleeve shaft 128 is provided with a clutch face 130, which is adapted to engage a corresponding clutch face 131 on the hub of the lower sprocket wheel 39.

Pivotally secured to the quill shaft 128, there is provided a shifter 132, which is adapted to manipulate the clutch face 130 into and out of engagement with the clutch face 131. For this purpose, the shifter 132 is pivotally supported on a bracket 133 at one end, and at its opposite end is pivotally connected to an angular link 134, which forms, with a link 135, a toggle joint, the opposite end of the link 135 being pivoted in any well known manner to the frame. At the junction of the links 134 and 135, there is provided a connecting rod 136, which extends to the front of the machine, where it is pivotally connected to a foot lever 137, as will be seen by reference to Fig. 2, which is pivotally connected with the frame, in juxtaposition to the operator's seat 83, so that the operator can readily manipulate the foot lever to throw the clutch face 130 into and out of engagement with the clutch face 131. The sprockets 128 are for the purpose of supporting and driving auxiliary feeder conveyers, in the form of endless chains 138 provided with fingers, which are adapted to bridge the gap between the end of the conveyers 35 and 36 and the sphere of operation of the packing arms 41 and 42. They also serve the purpose of turning the material at a slight angle to its previous direction of travel. The opposite ends of these feeder conveyers 138 are supported on sprocket wheels 139, secured to a suitable idle shaft 140, which is rotatably supported in the frame in any well known manner. It will thus be seen that when it is desired to stop the auxiliary feeder conveyer chains 138 so as to prevent the packing arms 41 and 42 from scooping in the stalks while the previously formed shock is being deposited on the ground, it is merely necessary for the operator to manipulate the foot lever 137 and throw the auxiliary feeder chains 138 out of driving connection with the shaft 127. In order that their movement may be positively prevented, the upper end of the sleeve shaft 128 is provided with a brake disk 141, which engages the top of the frame and positively prevents the further rotation of the sleeve shaft 128. The opposite ends of the feeder conveying chains 35 and 36, which are supported on the sprockets 38, 39 drive a shaft 142, on which these sprockets 38 are secured, which in turn drives, through a chain-and-sprocket connection, indicated by the numeral 143, a shaft 144, which has secured at the top, a bevel gear 145, which meshes with a bevel gear 146 on the shaft 18. The shaft 142 is also provided at its lower end with a gear 150, which drives a pair of idle gears 151, and thereby transmits the drive to a gear 152 on a shaft 153, which is provided at its upper end with a sprocket, which drives an endless chain 200, which in turn drives a sprocket on a vertical shaft 201. The shaft 201 is provided at its upper end with a bevel gear 154, which engages with a corresponding bevel gear 155 on the shaft 19. The chains 143 and 200 are in reality conveying chains, and are provided with fingers which are adapted to engage the stalks the same as the gathering chains 22 and 23 before them, and aid in the feeding of the stalks to the cutting mechanism. It will thus be seen that the gathering conveyers 12 and 13, 22 and 23, are driven from the feeder conveyers 35 and 36, which in turn are driven by the interconnecting mechanism from the traction wheel 3.

The operation of the device will be readily understood when taken in connection with the above description.

The harvester is drawn over the field by any suitable motive power, such as draft animals attached to the pole 6 and to the whiffletrees 7 and 8, and in such a manner that the guides 10 and 11 will be arranged on opposite sides of a row of growing stalks of any suitable character, such as corn. The conveyers 12, 13, 22, 23, 143 and 200 on the guide frames 10 and 11 form a gatherer, which, because of the inclined position of the conveyers, picks the drooping stalks and leaves, holding them in an erect position, and feeds them along through the gradually-converging passageway into the sphere of operation of the cutting mechanism 27. This mechanism, which is driven from the traction wheel 3, cuts the stalks from the roots on each stroke, and, because of the dividing action of the divider 28, is relieved of overwork, which might occur if the stalks were fed in a single bunch. The stalks are fed onto the apron 31 of the alley 32 by the last portion of the gathering conveyers 22 and 23, where they come into the sphere of action of the fingers on the feeding conveyers 35 and 36, which force them along in an erect position through the alley 32 until they come into the swing of the fingers on the auxiliary feed conveyer 138. This auxiliary conveyer, if in driving connection with the traction wheel 3, urges the stalks onward into the sphere of operation of the alternately swinging packing arms 41 and 42. These arms sweep the stalks through the non-return trap gate formed by the springs 53 and 54 into the crib 55. The spring arms 56 and 57 resist the on-coming stalks in a yielding manner, so that, while they still maintain the stalks in an upright position, they permit them to advance inwardly into the crib as their volume increases. When the first section of the crib in front of the arms 58 and 59 is completely filled, the arms 56 and 57 will have been swung outwardly along the sides of the crib 55, and the spring arms 58 and 59 will then utilize their yielding resistance to keep the accumulating shock of corn stalks in an erect position, and yet permit the material to be fed rearwardly to fill up the second compartment of the crib.

When the entire crib 55 is filled to the required degree, the operator on the seat 83, by manipulating the lever 102, swings the twine-carrying tubular arm 97 across the crib, so that the operator adjacent the crib can utilize the twine brought within reach, to tie the shock in a compact bundle. When the stalks are tied together to form a complete shock, the operator swings the tubular twine-carrying arm 97 back into its original position out of the way, and releases the lock 84 on the lever 81, permitting the chain 80 to slacken up, and thereby dropping the bottom doors 68 to 71. These bottom doors, by their very dropping action, remove the latches 90 from engagement with the locking bars 89, so that as the harvester moves forward, the gates 66 and 67 are free to swing outwardly, permitting the shock to remain stationary on the ground while the harvester travels away from it. The shock in falling, however, is divided by the divider 72, so that there is formed a ventilating passage therein, which not only permits the air to circulate through the shock while standing on the ground, but also permits the swivel steering wheel 5 to pass through beneath the shock without catching on any of the stalks thereof.

It is to be noted that when the bottom doors 68 to 71 are open and swung downwardly, they prevent the arms 86 on the shafts 60 to 63 from swinging inwardly, and thereby prevent the spring arms 56 to 59 from swinging across the crib, and thus keep them out of the way of the outwardly moving shock, so that they will not interfere with its progress. While the shock is being tied up and being deposited on the ground, it is highly desirable that no more stalks should be fed into the crib. To prevent the feeding of the stalks into the crib while these operations are taking place, the operator manipulates the lever 137, so as to force the sleeve shaft 128 upwardly, thus drawing the clutch face 130 out of engagement with the clutch face 131, and simultaneously forcing the friction disk 141 into engagement with the top of the frame, so that the sleeve shaft 128 will be disconnected from the driving mechanism, and thereby stop the feeding action of the auxiliary feeder conveyer 138. The stalks will then accumulate at the junction of the conveyers 35 and 36 with the feeder conveyers 138 until the depositing operation of the shock has been completed. When the shock has completely left the crib 55, and is entirely separated from the harvester, the gates 66 and 67 will automatically swing inwardly and close. The operator will then pull the lever 81 rearwardly, drawing up the bottom doors 68 to 71, which will automatically force the latches 90 into engagement with the locking bars 89, locking the gates 66 and 67 closed, and which will also simultaneously permit the shafts 60 to 63 to rotate, allowing the spring arms 56 to 59 to swing transversely of the crib 55. The operator will then connect the auxiliary feeder conveyers 138 into driving relation with the traction wheel 3, and the stalks will be once more fed into the sphere of operation of the swinging packing arms 41 and 42.

It is to be noted that because of the peculiar arrangement of these packing arms 41 and 42, they approach the oncoming stalks in an arcuate path, sweeping across the path of the stalks and pushing them in a progressive manner through the non-return trap-gate formed by the springs 53 and 54. The operation will be continued until another shock has been formed, which will in turn be deposited on the ground, and so on until the entire field is cut.

If at any time it should be desirable to run the machine over the ground without operating the various parts, as in passing to and from the field to be cut, the mechanism can be thrown out of driving relation with the traction wheel 3 by manipulating the lever 114 to throw the clutch 113 out of engagement with the clutch face on the sprocket wheel 105. It is to be noted that the main frame carrying the driving mechanism will be covered, to protect the operator from the moving parts.

While I have shown one embodiment of my invention, I do not wish to be limited to the specific details thereof, but desire to be protected in various changes, modifications and alterations which I may make within the scope of the appended claims.

Having thus described my invention, I claim as new and desire to secure by Letters Patent:—

1. In a harvester, the combination with a shock-forming mechanism, of a stalk-feeding mechanism, comprising a shaft and a plurality of conveying chains driven by said shaft, means for driving said shaft, a sleeve shaft on said shaft, means for clutching said sleeve shaft to said first-mentioned shaft, means for disconnecting said clutching means, and an auxiliary feed conveyer driven by said sleeve shaft and adapted to transport stalks from said feeding mechanism to said shock-forming mechanism.

2. In a harvester, the combination with feeding mechanism, of shock-forming mechanism, comprising a crib, means for packing said crib, pivot doors for said crib, gates for said crib, means for locking said gates closed, and means operated by said doors for releasing said locking means.

3. In a harvester, the combination with feeding mechanism, of shock-forming mechanism, comprising a crib, means for packing said crib, arms for maintaining the stalks packed by said packing means in a vertical position, doors for said crib, and means connected to said arms for preventing said arms extending transversely of said crib when said doors are open.

4. In a harvester, the combination with a crib, of packing mechanism for said crib, a gate for said crib, a bottom door for said crib, and connections between said gate and said bottom door, whereby the opening of said door unlocks said gate and the closing of said door locks said gate.

5. In a harvester, the combination with a crib, of a gate for said crib, a bottom door for said crib, a locking bar connected to said gate, a latch adapted to engage said locking bar to lock said gate closed, and means for connecting said door to said latch, whereby the opening and closing of said door will manipulate said latch to unlock and lock said gate.

6. In a harvester, the combination with a crib, of a plurality of pivoted gates for said crib, adapted to automatically close, locking bars for said gate, latches for engaging said locking bars, a plurality of bottom doors for said crib, and connections between said latches and said bottom doors, whereby the movement of said doors manipulates said latches.

7. In a harvester, the combination with a crib, of packing mechanism for forcing stalks into said crib, an arm adapted to extend transversely of said crib and also adapted to maintain the stalks in said crib in an erect position, a rotatable shaft for supporting said arm, means for automatically returning said arm to its normal transverse position, a door for said crib, and means on said shaft adapted to engage said door to prevent said arm from extending transversely of said crib when said door is open.

In testimony whereof I have signed my name to this specification in the presence of two subscribing witnesses.

JOHN J. LONSWAY.

Witnesses:
JOSEPH M. BARRETT,
CAROLYN WERNER.

---

Copies of this patent may be obtained for five cents each, by addressing the "Commissioner of Patents, Washington, D. C."